US012801790B2

(12) United States Patent
Li

(10) Patent No.: US 12,801,790 B2
(45) Date of Patent: Nov. 17, 2026

(54) INFORMATION LEAKAGE DETECTION METHOD AND APPARATUS, AND COMPUTER-READABLE MEDIUM

(71) Applicant: Siemens Aktiengesellschaft, Munich (DE)

(72) Inventor: Rui Li, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 750 days.

(21) Appl. No.: 17/927,055

(22) PCT Filed: May 28, 2020

(86) PCT No.: PCT/CN2020/093047
§ 371 (c)(1),
(2) Date: Nov. 22, 2022

(87) PCT Pub. No.: WO2021/237621
PCT Pub. Date: Dec. 2, 2021

(65) Prior Publication Data

US 2023/0222249 A1 Jul. 13, 2023

(51) Int. Cl.
*G06F 21/00* (2013.01)
*G06F 21/60* (2013.01)
(Continued)

(52) U.S. Cl.
CPC ............ *G06F 21/64* (2013.01); *G06F 21/602* (2013.01); *H04L 9/3247* (2013.01)

(58) Field of Classification Search
None
See application file for complete search history.

(56) References Cited

U.S. PATENT DOCUMENTS

2011/0314550 A1* 12/2011 Mastrangelo ......... G06T 1/0021 726/26
2015/0312211 A1 10/2015 Beauchesne ............ H04L 29/12
(Continued)

FOREIGN PATENT DOCUMENTS

CN 107743123 A 2/2018 ............... G06T 1/00
CN 108292133 7/2018 ........... G05B 19/418
(Continued)

OTHER PUBLICATIONS

Wu, J Z et al., “An Android Privacy Leakage Malicious Application Detection Approach Based on Directed Information Flow,” Journal of University of Chinese Academy of Sciences, vol. 32, No. 6, pp. 807-815 (Chinese w/ English abstract), Jun. 13, 2015.
(Continued)

*Primary Examiner* — Andrew J Steinle
(74) *Attorney, Agent, or Firm* — Slayden Grubert Beard PLLC

(57) ABSTRACT

Various embodiments of the teachings herein include an information leakage detection method. In some embodiments, the method includes: acquiring a data packet sent from a protected system to the outside; identifying signatures from the data packet, wherein a signature uniquely corresponds to a host in the protected system and is stored in one or a plurality of files in the corresponding host; and when a signature is identified, deciding information in the host corresponding to the identified signature is leaked.

13 Claims, 2 Drawing Sheets

(51) Int. Cl.
*G06F 21/64* (2013.01)
*H04L 9/32* (2006.01)

(56) References Cited

U.S. PATENT DOCUMENTS

| | | | | |
|---|---|---|---|---|
| 2017/0149811 | A1 | 5/2017 | Corrales | H04L 63/1425 |
| 2017/0353460 | A1 | 12/2017 | Knapp et al. | |
| 2022/0353089 | A1* | 11/2022 | Masny | H04L 9/3247 |

FOREIGN PATENT DOCUMENTS

| | | | | |
|---|---|---|---|---|
| CN | 108985081 | A | 12/2018 | G06F 21/60 |
| CN | 109196509 | A | 1/2019 | G06F 21/60 |
| CN | 109802953 | | 5/2019 | H04L 29/06 |
| CN | 111181971 | | 5/2020 | |

OTHER PUBLICATIONS

Chinese Office Action, Application No. 202080099459.5, 5 pages, Jul. 5, 2024.

Silowash, George J. et al., "Detecting and Preventing Data Exfiltration Through Encrypted Web Sessions via Traffic Inspection," Research Showcase @ CMU, Software Engineering Institute, 68 pages, Mar. 1, 2013.

European Office Action, Application No. 20938473.4, 5 pages, Sep. 23, 2024.

Search Report for International Application No. PCT/CN2020/093047, 4 pages, Mar. 2, 2021.

Xian, He-Qun: "Leakage Identification and Quantitative Evaluation Scheme for Confidential Databases"; vol. 32. No. 4; DOI: 10.3724/SP.J.1016 .2009.00721, Apr. 1, 2009.

Extended European Search Report, Application No. 20938473.4, 7 pages, Dec. 8, 2023.

* cited by examiner

INFORMATION LEAKAGE DETECTION METHOD AND APPARATUS, AND COMPUTER-READABLE MEDIUM

CROSS-REFERENCE TO RELATED APPLICATIONS

This application is a U.S. National Stage Application of International Application No. PCT/CN2020/093047 filed May 28, 2020, which designates the United States of America, the contents of which are hereby incorporated by reference in their entirety.

TECHNICAL FIELD

The present disclosure relates to cyber security. Various embodiments include information leakage detection methods and/or apparatus.

BACKGROUND

Cyber security is increasingly important. Information leakage detection systems, as a type of security solution, can be used to detect accidental outflow of information, monitoring permissions, access status and unauthorized access identities. At present, common operation methods of information leakage detection systems include: using encryption methods to protect data, using software installed on the operating system to monitor access to files, etc. The implementation mechanisms of these information leakage detection systems are relatively complex, the software implementation involves the operating system, and most of them need to be implemented by processes running at the backend.

For example, the patent document titled "Information Leak Prevention Device, and Method and Program Thereof" with a publication number of CN101971186B uses encryption to protect data; while "Method and Apparatus for Preventing Information Leak" with a publication number of CN1300654C discloses a solution that utilizes software installed on the operating system to monitor access to files. At present, most information leakage detection systems need to be implemented by software running on the protected systems, which consumes a large amount of computer resources and may cause failure of the protected systems to run normally.

SUMMARY

Embodiments of the teachings of the present disclosure include information leakage detection methods and apparatus, and a computer-readable medium, which can effectively detect information leakage and uses a smaller amount of computer resources. For example, some embodiments include an information leakage detection method (200), characterized by comprising: acquiring (S201) a data packet (30) sent from a protected system (100) to the outside; identifying (S202) signatures from the data packet (30), wherein a signature uniquely corresponds to a host (1000) in the protected system (100) and is stored in one or a plurality of files in the corresponding host (1000); and when a signature is identified, deciding (S203) that information in the host (1000) corresponding to the identified signature is leaked.

In some embodiments, identifying (S202) a signature from the data packet (30) comprises: using each pre-stored coded signature to match the data packet (30) to identify a signature; and/or using each pre-stored compressed signature to match the data packet (30) to identify a signature.

In some embodiments, the one or plurality of files start and end with the signature corresponding to the host where they are located.

In some embodiments, the one or plurality of files include at least one of the following information items: file description information; and information of the host (1000) where the file is located.

In some embodiments, a signature is stored in a plurality of files in the corresponding host (1000), and the plurality of files are located at different positions of the host (1000).

In some embodiments, each of the plurality of files includes storage location information of the file in the host (1000).

In some embodiments, a signature is generated based on an identifier of the corresponding host (1000); or a signature is generated based on a plurality of identifiers of the corresponding host (1000).

In some embodiments, a signature is computed based on a Hash algorithm, and the signatures corresponding to different hosts (1000) have the same length.

In some embodiments, the file name of the one or plurality of files includes the signature corresponding to the host where a file is located.

In some embodiments, the one or plurality of files are hidden files and/or static files.

As another example, some embodiments include an information leakage detection apparatus (10), characterized by comprising: a data packet acquiring module (201), configured to acquire a data packet (30) sent from a protected system (100) to the outside; a signature identification module (202), configured to identify signatures from the data packet (30), wherein a signature uniquely corresponds to a host (1000) in the protected system (100) and is stored in one or a plurality of files in the corresponding host (1000); and a deciding module (203), configured to, when a signature is identified, decide that information in the host (1000) corresponding to the identified signature is leaked.

In some embodiments, the data packet acquiring module (201) is specifically configured to: use each pre-stored coded signature to match the data packet (30) to identify a signature; and/or use each pre-stored compressed signature to match the data packet (30) to identify a signature.

As another example, some embodiments include an information leakage detection apparatus (10), characterized in that it comprises: at least one memory (101), configured to store computer-readable code; and at least one processor (102), configured to call the computer-readable code to execute one or more of the methods described herein.

As another example, some embodiments include a computer-readable medium, characterized in that the computer-readable medium stores a computer-readable instruction, which, when executed by a processor, causes the processor to execute one or more of the methods described herein.

REFERENCE NUMERALS IN THE DRAWINGS

Figure 1:
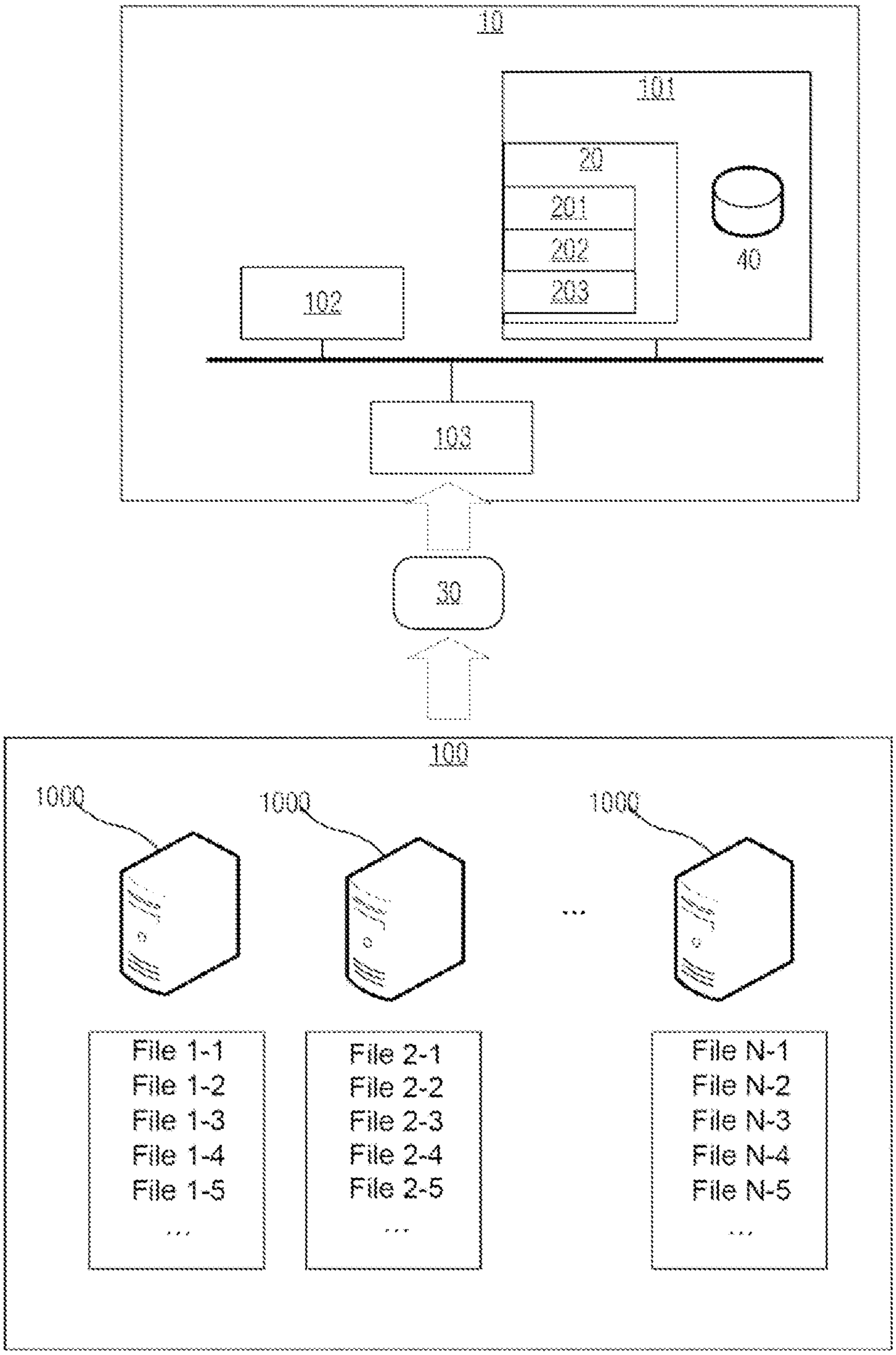
FIG. 1 is a schematic structural diagram of an information leakage detection apparatus incorporating teachings of the present disclosure.

| | | |
|---|---|---|
| 100: protected system | 1000: host in the protected system | 10: information leakage detection apparatus |
| 20: information leakage detection program | 30: data packet | 40: signature |
| 101: at least one memory | 102: at least one processor | 103: communication module |
| 201: image acquiring module | 202: signature identification module | 203: deciding module |
| 200: information leakage detection method | S201-S203: steps of method 200 | |
| 1000: host in the protected system 100 | | |

DETAILED DESCRIPTION

Some embodiments of the teachings herein include an information leakage detection method comprising: acquiring a data packet sent from a protected system; identifying signatures from the data packet, wherein a signature uniquely corresponds to a host in the protected system and is stored in one or a plurality of files in the corresponding host; if a signature is identified, deciding that information in the host corresponding to the identified signature is leaked.

Some embodiments include an information leakage detection apparatus comprising: a data packet acquiring module, configured to acquire a data packet sent from a protected system; a signature identification module, configured to identify signatures from the data packet, wherein a signature uniquely corresponds to a host in the protected system and is stored in one or a plurality of files in the corresponding host; and a deciding module, configured to decide that information in the host corresponding to the identified signature is leaked if a signature is identified.

Some embodiments of the teachings herein include an information leakage detection apparatus comprising: at least one memory, configured to store a computer-readable code; at least one processor, configured to call the computer-readable code to perform the steps of one or more of the methods described herein.

Some embodiments of the teachings herein include a computer-readable medium which stores a computer-readable instruction that, when executed by a processor, causes the processor to perform the steps of one or more of the methods described herein.

In some embodiments, files comprising signatures are stored in a host of the protected system in advance. Because the signatures in these files are identifiable, it is possible for an attacker to transmit these files together when attempting to steal information from the protected system, and the signatures contained in these files will appear in the data packets sent from the protected system to the outside. Since a signature is unique to one host in the protected system, it is possible to determine from which host the information is leaked. The solution has the advantages of simple implementation and little impact on the protected system. It can be deployed on devices or systems with limited resources, can effectively detect information leakage, and can track the particulars of the information leaked, for example, the location of the leaked information in the protected system, etc.

In some embodiments, optionally, for identifying signatures from a data packet, each pre-stored encoded signature may be used to match the data packet to identify a signature. Optionally, for identifying signatures from a data packet, each pre-stored compressed signature may be used to match the data packet to identify a signature. When an attacker steals information, the information may be encoded, compressed, etc. Therefore, each signature may be processed in advance with different encoding methods and compression methods, and the processed signatures are stored. In this way, after a data packet is acquired, the processed signatures are directly used for matching easily and quickly. Once matching is successful, the decoding and decompression methods used by the attacker can also be determined. Based on this, the information stolen by the attacker can be further decoded and decompressed to determine what information is stolen from where in which host and when.

In some embodiments, the one or plurality of files start and end with the signature corresponding to the host where they are located. Such a special location facilitates signature extraction. In addition, with the signature as the start and end, the content in the middle of a file can be demarcated, so that the content in the middle of the file can be easily extracted.

In some embodiments, the one or plurality of files include at least one of the following information items: file description information; information of the host where a file is located. These information items may be used to analyze the attacker's behavior and may also be used to determine the information is stolen by the attacker from where in which host and when, which can provide basis for further emergency measures and evidence collection.

In some embodiments, a signature is stored in a plurality of files in the corresponding host, and the plurality of files are located at different positions of the host. A plurality of files at different locations can further increase the probability of detecting information leakage.

In some embodiments, each of the plurality of files includes storage location information of the file in the host. The obtained storage location information may be used to analyze the attacker's behavior.

In some embodiments, a signature is generated based on an identifier of the corresponding host. In some embodiments, a signature is generated based on a plurality of identifiers of the corresponding host. The advantage of this is that it can prevent the collision of signatures of different hosts after a certain algorithm is used to generate the signatures.

In some embodiments, a signature is computed based on a hash algorithm, and the signatures corresponding to different hosts have the same length. In this way, the signature lengths of different hosts are made the same, which is convenient for subsequent identification of signatures from data packets.

In some embodiments, the file name of the one or plurality of files includes the signature corresponding to the host where the file is located. The more times a signature appears, the more likely it is to be identified after it is packaged into a data packet.

In some embodiments, the one or plurality of files are hidden files and/or static files. It is safer to place static files in a protected system, which usually poses no additional risk. Setting files as hidden files can reduce the probability of attackers discovering the files and make it easier to detect information leakage.

The subject matter described herein will now be discussed by referring to exemplary embodiments. It should be understood that the discussion of these embodiments is only intended to enable those skilled in the art to better understand and realize the subject described herein, and is not intended to limit the scope, applicability, or examples set forth in the claims. The functions and arrangement of the discussed elements may be changed without departing from the scope of the present disclosure. Various processes or components may be deleted, replaced or added in each example as needed. For example, the method described herein may be executed in a sequence different from the described sequence, and various steps may be added, omitted, or combined. In addition, the features described in relation to some examples may also be combined in other examples.

As used herein, the term "comprise" and its variations is an open term that means "including but not limited to". The term "based on" means "at least partially based on". The term "one embodiment" or "an embodiment" means "at least one embodiment". The term "another embodiment" means "at least one other embodiment". The term "first", "second", etc. may refer to different or the same objects. Other definitions, either explicit or implicit, may be included below. Unless clearly indicated in the context, the definition of a term is consistent throughout the description.

FIG. 1 shows the structure of the information leakage detection apparatus 10 incorporating teachings of the present disclosure and its connection with a protected system 100. In FIG. 1, the protected system 100 comprises at least one host 1000 (in one scenario, the protected system 100 is a host 1000 with an Internet connection). Each of some or all of the hosts 1000 in the protected system 100 stores at least one file (only one file or a plurality of files) in advance, and the at least one file is different from ordinary files in that it includes a preset signature 40, which uniquely corresponds to the host where it is located. That is, the signatures included in the at least one file pre-stored on different hosts are different from each other.

The preset signature 40 may be stored in a signature library, which can be stored in at least one memory 101 of the information leakage detection apparatus 10, or may be stored in a separate computer, for example, a remote server. The information leakage detection apparatus 10 can acquire a data packet 30 sent from the protected system 100 through its communication module 103 and identify from the data packet 30 whether there is a signature 40 pre-stored in the signature library, or, when there is a signature 40, decide that the information in the host 1000 corresponding to the signature 40 is leaked.

The information leakage detection apparatus 10 may acquire the data packet 30 in a variety of optional methods. For example, the protected system 100 is connected to a network traffic distributor, which is used to copy or forward the data packet 30 sent from the protected system 100 to the outside. In implementation, the network traffic distributor may be a switch, a router, a firewall, or a gateway. The device may be part of the protected system 100 or part of the information leakage detection apparatus 10. The information leakage detection apparatus 10 acquires the data packet 30 through this device.

As mentioned previously, conventional information leakage detection methods require running software on the protected system, which consumes the processing and storage resources of the protected system. Conventional methods cannot be applied to systems with limited processing and storage resources. For example, for an upper computer in an industrial control system, its purpose is for industrial control, often with limited processing and storage resources, and thus conventional information leakage detection methods cannot be applied.

In some embodiments, files containing signatures are pre-stored in the host 1000 of the protected system 100, for example, in some folders that store key information. Because the signatures in these files are identifiable, it is possible for an attacker to transmit these files together when attempting to steal information from the protected system 100, and the signatures comprised in these files will appear in the data packets 30 sent from the protected system 100 to the outside. It should be noted that the data packets 30 may be packets conforming to any network protocol, and the information leakage detection apparatus 10 may acquire these data packets 30, analyze them according to the corresponding network protocol, acquire the payload transmitted in the data packets 30, and use pre-stored signatures 40 to match the contents of these payloads, to decide whether the data packets 30 include preset signatures 40. Since a signature 40 is unique to one host 1000 in the protected system 100, it is possible to determine from which host 1000 information is leaked.

In some embodiments, a file may start and end with its corresponding signature 40, and such a special position facilitates extraction of the signature 40. In addition, with the signature 40 as the start and end, the content in the middle of a file can be demarcated, so that the content in the middle of the file can be easily extracted. Optionally, the file name may also include the signature 40. The more times a signature 40 appears, the more likely it is to be identified after it is packaged into a data packet 30. In addition to the signature at the start and end of a file, the following information may also be included:

1) File description information

For example, the file creation time, file modification time, file creator, file processor, file storage location, etc.

2) Information of the host 1000

For example, the name of the host 1000, IP address of the host 1000, etc.

These information items may be used to analyze the attacker's behavior and may also be used to determine the information is stolen by the attacker from where in which host and when, which can provide basis for further emergency measures and evidence collection.

In some embodiments, a host 1000 may store a plurality of such files, and these files may be stored at different locations on the host 1000. In some embodiments, the file content may include the storage location information of the file in the host 1000. A plurality of files in different locations can further increase the probability of detecting information leakage; in addition, the obtained storage location information may also be used to analyze the behavior of an attacker.

In some embodiments, the signature 40 may be generated based on an identifier of the host 1000, for example, the ID of the host 1000, or the name of the host 1000. In some embodiments, a signature 40 may also be generated based on a plurality of identifiers of the host 1000. The advantage of this is that it can prevent the collision of signatures of different hosts 1000 after a certain algorithm is used to generate the signatures 40.

In some embodiments, a signature 40 may be generated based on a hash algorithm. In this way, the lengths of the signatures 40 of different hosts 10000 are made the same, which is convenient for subsequent identification of signatures 40 from data packets 30. The Hash algorithm may be the message digest algorithm (MD5), secure hash algorithm (SHA-1), etc.

When an attacker steals information, the information may be encoded, compressed, etc., for example, Base64 processing, Uniform Resource Locator (URL) encoding, tar packaging, etc. Therefore, the information leakage detection apparatus 10 can process each signature 40 in advance with different encoding methods and compression methods and store the processed signatures 40. In this way, after a data packet 30 is acquired, the processed signatures 40 are directly used for matching easily and quickly. Once matching is successful, the decoding and decompression methods used by the attacker can also be determined. Based on this, the information stolen by the attacker can be further decoded and decompressed to determine what information is stolen from where in which host and when.

In some embodiments, these files may be set as hidden files, for example, by prefixing the filename with a dot. This can reduce the probability of attackers discovering the files and make it easier to detect information leakage.

In some embodiments, these files may be static files, for example, .txt files. Compared with dynamic files, for example, executable files such as .exe files, it is safer to place these files in the protected system 100 without posing additional risk.

The implementation of the information leakage detection apparatus 10 will be described below with reference to FIG. 1. For example, it may be implemented as a network of computer processors, to execute the information leakage detection method 200 in the embodiments of the teachings herein. The information leakage detection apparatus 10 may also be a single computer as shown in FIG. 1, which comprises at least one memory 101 comprising a computer-readable medium, for example, a random access memory (RAM). The apparatus 10 further comprises at least one processor 102 coupled to the at least one memory 101. A computer-executable instruction is stored in the at least one memory 101, and, when executed by the at least one processor 102, can cause at least one processor 102 to perform the steps described herein.

The at least one processor 102 may be a microprocessor, an application specific integrated circuit (ASIC), a digital signal processor (DSP), a central processing unit (CPU), a graphics processing unit (GPU), a state machine, etc. Examples of the computer-readable medium include, but are not limited to, a floppy disk, CD-ROM, magnetic disk, memory chip, ROM, RAM, ASIC, configured processor, all-optical medium, all magnetic tape or another magnetic medium, or any other medium from which a computer processor can read instructions. In addition, various other forms of computer-readable media can transmit or carry instructions to a computer, including routers, private or public networks, or other wired and wireless transmission devices or channels. The instructions may include code in any computer programming language, including C, C++, C language, Visual Basic, java, and JavaScript.

When executed by the at least one processor 102, the at least one memory 101 shown in FIG. 1 may contain an information leakage detection program 20, so that the at least one processor 102 executes the information leakage detection method 200 described in the embodiments of the present invention. The information leakage detection program 20 may comprise:

- a data packet acquiring module 201, configured to acquire a data packet 30 sent from the protected system 100 to the outside;
- a signature identification module 202, configured to identify a signature 40 from the data packet 30;
- a deciding module 203, configured to: when a signature 40 is identified, decide that information in the host 1000 corresponding to the identified signature 40 is leaked.

It should be mentioned that embodiments of teachings of the present disclosure may include apparatuses having different architectures than that shown in FIG. 1. The above architecture is only exemplary and is used to explain the method 200.

In some embodiments, the above modules may also be regarded as functional modules implemented by hardware, which are used to implement various functions involved in the information leakage detection apparatus 10 when executing the information leakage detection method. For example, the control logics of the processes involved in the method are burnt into a chip such as a field-programmable gate array (FPGA) or a complex programmable logic device (CPLD), and these chips or devices perform the functions of the above modules. The specific implementation method can be determined according to the engineering practice.

Figure 2:
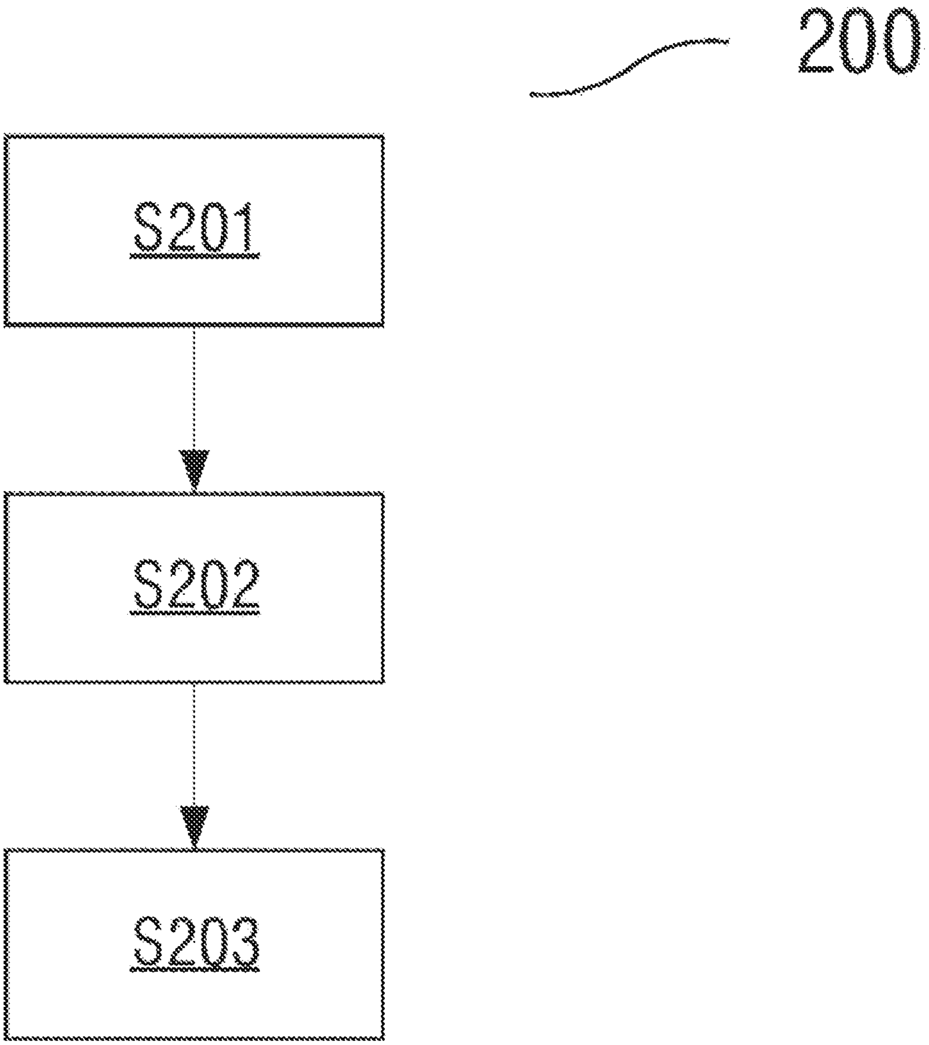
FIG. 2 is a flowchart of an information leakage detection method incorporating teachings of the present disclosure.

As shown in FIG. 2, one exemplary method 200 incorporating teachings of the present disclosure comprises the following steps:

- S201: acquiring a data packet 30 sent from a protected system 100 to the outside;
- S202: identifying signatures from the data packet 30, wherein a signature uniquely corresponds to a host 10000 in the protected system 100 and is stored in one or a plurality of files in the corresponding host 1000; and
- S203: when a signature is identified, deciding that information in the host 1000 corresponding to the identified signature is leaked.

For other optional implementations of the method, reference may be made to the foregoing description, which will not be repeated here. In addition, the various embodiments of the present disclosure may include a computer-readable medium storing a computer-readable instruction, which, when executed by a processor, causes the processor to perform the information leakage detection method described above. Examples of the computer-readable medium include floppy disks, hard disks, magneto-optical disks, optical disks (such as CD-ROM, CD-R, CD-RW, DVD-ROM, DVD-RAM, DVD-RW, and DVD+RW), magnetic tapes, volatile memory cards and ROMs. In some embodiments, the computer-readable instruction may be downloaded from a server computer or a cloud via a communication network.

In some embodiments, there is an information leakage detection method and/or apparatus, and a computer-readable medium. They have the advantages of simple implementation and little impact on the protected system. It can be deployed on devices or systems with limited resources, can effectively detect information leakage, and can track the particulars of the information leaked, for example, the location of the leaked information in the protected system, etc.

It should be noted that not all steps and modules in the above processes and system structural diagrams are necessary, and some steps or modules may be ignored based on actual needs. The sequence of execution of the steps is not fixed and can be adjusted as needed. The system structure described in the above embodiments may be a physical structure or a logical structure, i.e., some modules may be implemented by the same physical entity, or some modules may be implemented by multiple physical entities or may be implemented by certain components in several independent devices working together.

What is claimed is:

1. An information leakage detection method, the method comprising:

acquiring a data packet sent from a protected system to the outside, the data packet conforming to a network protocol and including at least one signature in the payload of the packet;

identifying the at least one signature in the data packet, wherein the at least one signature uniquely corresponds to a host in the protected system and is stored in at least one file in the corresponding host; and when the at least one signature in the data packet is identified, deciding information in the host corresponding to the identified signature is leaked;

wherein the at least one signature in the data packet includes at least one datum selected from the group consisting of: a file creation time, a file modification time, a file creator, a file processor, a file storage location, and an IP address of the host.

2. The method claimed in claim 1, wherein identifying the at least one signature in the data packet comprises:

using each pre-stored coded signature to match the data packet to identify the at least one signature; and/or using each pre-stored compressed signature to match the data packet to identify the at least one signature.

3. The method as claimed in claim 1, wherein the at least one file starts and ends with the signature corresponding to the host where they are located.

4. The method as claimed in claim 1, wherein the at least one file includes at least one of the following information items:

file description information; and information of the host where the file is located.

5. The method as claimed in claim 1, wherein:

a signature is stored in a plurality of files in the corresponding host; and a plurality of files are located at different positions of the host.

6. The method as claimed in claim 5, wherein each of the plurality of files includes storage location information of the file in the host.

7. The method as claimed claim 1, wherein:

a signature is generated based on an identifier of the corresponding host; or a signature is generated based on a plurality of identifiers of the corresponding host.

8. The method as claimed in claim 1, further comprising computing a signature based on a Hash algorithm;

wherein the signatures corresponding to different hosts have the same length.

9. The method as claimed in claim 1, wherein the file name of the one or plurality of files includes the signature corresponding to the host where a file is located.

10. The method as claimed in claim 1, wherein the one or plurality of files comprise hidden files and/or static files.

11. An information leakage detection apparatus comprising:

a data packet acquiring module including a first set of control logics programmed into a chip configured to acquire a data packet sent from a protected system to the outside, the data packet conforming to a network protocol and including at least one signature in the payload of the packet;

a signature identification module including a second set of control logics programmed into the chip configured to identify the at least one signature in the data packet, wherein the at least one signature uniquely corresponds to a host in the protected system and is stored in one or a plurality of files in the corresponding host; and a deciding module including a third set of control logics programmed into the chip configured to, when the at least one signature is identified, decide that information in the host corresponding to the at least one identified signature is leaked;

wherein the at least one signature includes at least one datum selected from the group consisting of: a file creation time, a file modification time, a file creator, a file processor, a file storage location, and an IP address of the host.

12. The apparatus as claimed in claim 11, wherein the data packet acquiring module is further configured to:

use each pre-stored coded signature to match the data packet to identify the at least one signature; and/or use each pre-stored compressed signature to match the data packet to identify the at least one signature.

13. An information leakage detection apparatus comprising:

a memory configured to store computer-readable code;

a processor configured to call the computer-readable code to:

acquire a data packet sent from a protected system to the outside, the data packet conforming to a network protocol and including at least one signature in the payload of the packet;

identify at least one signature in the data packet, wherein a signature uniquely corresponds to a host in the protected system and is stored in at least one file in the corresponding host; and when the at least one signature is identified, decide information in the host corresponding to the at least one identified signature is leaked;

wherein the at least one signature includes at least one datum selected from the group consisting of: a file creation time, a file modification time, a file creator, a file processor, a file storage location, and an IP address of the host.

* * * * *